United States Patent [19]

Asawa et al.

[11] 4,085,387
[45] Apr. 18, 1978

[54] STARK-TUNED LASER MODULATOR

[75] Inventors: Charles K. Asawa, Pacific Palisades; Thomas K. Plant, Thousand Oaks, both of Calif.

[73] Assignee: Hughes Aircraft Company, Culver City, Calif.

[21] Appl. No.: 715,461

[22] Filed: Aug. 18, 1976

[51] Int. Cl.² ............................................... H01S 3/10
[52] U.S. Cl. ............................. 331/94.5 M; 332/7.51; 350/356
[58] Field of Search .............. 331/94.5 M; 350/160 R; 332/7.51; 250/199

[56] References Cited

U.S. PATENT DOCUMENTS

| | | | |
|---|---|---|---|
| 3,215,038 | 11/1965 | Heller et al. | 331/94.5 M |
| 3,806,834 | 4/1974 | Johnston et al. | 331/94.5 M |
| 3,842,372 | 10/1974 | Pao et al. | 331/94.5 M |
| 3,860,884 | 1/1975 | Chang et al. | 331/94.5 M |

*Primary Examiner*—William L. Sikes
*Attorney, Agent, or Firm*—P. M. Coble; W. H. MacAllister

[57] ABSTRACT

Apparatus is disclosed for modulating the R(18) or the R(24) lines of the (00°1 - 10°0) vibrational band of a $C^{13}O_2^{16}$ laser using Stark-tuned absorption resonances in $N^{14}H_3$. A dc electric field is applied to a Stark cell containing $N^{14}H_3$ gas to tune the asQ(6,6) absorbing transition in $N^{14}H_3$ so as to overlap the R(18) laser line or the asQ(2,2) transition so as to overlap the R(24) line. Modulating frequencies approaching 300 MHz can be employed, and a 100% modulation depth is achievable with audio modulating frequencies. Unsaturated modulation has been obtained using a Stark cell of 10 cm length and containing $N^{14}H_3$ gas at a pressure of 0.45 Torr for a laser power density of 12 watts per cm².

9 Claims, 3 Drawing Figures

STARK-TUNED LASER MODULATOR

BACKGROUND OF THE INVENTION

This invention relates to the modulation of laser beams, and more particularly it relates to a laser beam modulator using Stark-tuned absorption resonances.

In recent years there has been considerable interest in developing laser beam modulators utilizing the Stark effect (the change in the spectrum of a molecule when subjected to an electric field). A laser beam is passed through a cell containing gas molecules having an absorption resonance near the frequency of the laser beam, and a dc electric field is applied to the cell to shift, or turn, the absorption resonance so as to overlap the frequency of the laser beam. A modulating signal applied to the cell varies the absorption resonance about its steady state value, producing modulation of the laser beam.

Some of the early work in Stark-effect laser beam modulation is described in a paper by A. Landman et al, "Light Modulation by Means of the Stark Effect in Molecular Gases-Application to $CO_2$ Lasers", *Applied Physics Letters*, Vol. 15, No. 11 (Dec. 1, 1969), pages 357-360. These modulators employed Stark cells approximately 1 meter in length and containing a number of different absorbing gases at pressures ranging from about 2 to about 10 Torr. The highest modulation depth (the ratio of the amplitude of the modulation envelope to the carrier amplitude) achieved with such modulators was 20% at a modulating frequency of about 250 Hz.

Following the initial work with Stark cell laser modulators, substantial effort was made to achieve greater modulation depths, higher modulating frequencies, and shorter Stark cells. This effort has involved, among other things, a search for new combinations of particular laser lines and Stark-tunable absorbing materials. As a result of this effort a number of Stark-effect modulators were developed.

One such modulator is disclosed in U.S. Pat. No. 3,806,834 to A. R. Johnston et al. In this modulator the 10.6 $\mu$m, P(20) line of a $C^{12}O_2^{16}$ laser is used in conjunction with a Stark cell filled with about equal parts of $N^{14}H_3$ and $N^{14}D_3$ (to form $N^{14}H_2D$). A modulation depth of 40% was achieved for a modulating frequency of 400 Hz in a cell about 20 cm long with a gas pressure of 4 Torr.

Another Stark-effect modulator is disclosed in a paper by J. T. LaTourrette et al, "An Efficient Stark-Effect Modulator at 9.6 Microns", *Symposium on Optical and Acoustical Micro-Electronics*, Polytechnic Press of the Polytechnical Institute, Brooklyn, N.Y., 1975, pages 535-541. This modulator utilized the P(32) rotational line (at 1035.47 cm$^{-1}$) of the (001-020) vibrational band of a $C^{12}O_2^{16}$ laser in conjunction with a Stark cell filled with the methyl fluoride isotopic species $C^{13}H_3F$. A modulation depth of 10% was achieved with audio frequency modulation (e.g., 60 Hz) in a cell of 10 cm length, and a relatively constant modulation response was obtained as the frequency was increased to about 30 MHz (with a reduced modulation depth). However, due to saturation of the absorbing medium, the maximum usable laser power density was less than 0.1 watt per cm$^2$.

One searching for new combinations of particular laser lines and Stark-turnable absorbing materials has available to him an abundance of spectroscopic data with respect to materials having absorption resonances at frequencies in the vicinity of known laser transition frequencies. For example, in a paper by F. Shimizu "Stark Spectroscopy of $NH_3\nu_2$ Band by 10-$\mu CO_2$ and $N_2O$ Lasers", *Journal of Chemical Physics*, Vol. 52, No. 7 (Apr. 1, 1970), pages 3572-3576, an extensive table is presented listing near coincidences between $N^{14}H_3$ absorption lines and various $C^{12}O_2^{16}$ laser lines. In addition, in a paper by F. Allario et al, "Measurements of $NH_3$ Absorption Coefficients with a $C^{13}O_2^{16}$ Laser", *Applied Optics*, Vol. 14, No. 9 (September 1975), pages 2229-2233, measured absorption coefficients of $N^{14}H_3$ are given using the transitions R(8) through R(28) of a $C^{13}O_2^{16}$ laser. The absorption measurements were made with $N^{14}H_3$ gas at a pressure of 1 Torr broadened to a total pressure of 760 Torr by the addition of $N_2$ gas and in the absence of any electric field.

With the aforementioned prior art at hand, attempts to develop improved Stark-effect laser modulators continued with the goals of increasing the modulation depth, increasing the workable modulating frequencies, increasing the usable laser power density, and at the same time providing a reliable device of minimum size and weight which could be made as inexpensively as possible. However, since many of these goals are incompatible with one another, it seemed that the realization of a Stark-effect modulator in which all of these goals could be achieved at the same time was beyond the grasp of the scientific community.

SUMMARY OF THE INVENTION

It is an object of the present invention to provide a Stark-tuned modulator for a laser beam which simultaneously achieves increased modulation depths, increased modulating frequencies, and increased usable laser power densities in a reliable device of minimum size, weight and cost.

A modulator according to the invention comrises a laser generator including a $C^{13}O_2^{16}$ laser medium for generating a laser beam at a frequency corresponding to either the R(18) transition or the R(24) transition of the (00°1-10°0) vibrational band of $C^{13}O_2^{16}$. A Stark cell disposed in the path of the laser beam contains $N^{14}H_3$ gas having an absorption resonance in the vicinity of the frequency of the laser beam. A dc electric field is generated within the Stark cell of a value to turn the absorption resonance so as to overlap the frequency of the laser beam. A modulating voltage is applied to the Stark cell to vary the instantaneous frequency of the absorption resonance and thereby modulate the laser beam accordingly.

A modulator according to the invention is operable with substantially higher modulating frequencies (approaching 300 MHz) than any known Stark-effect laser modulator of the prior art, and a modulation depth of 100% can be achieved at audio modulating frequencies. In addition, an unsaturated modulated laser power density of 12 watts per cm$^2$ has been achieved using a Stark cell of 10 cm length and containing commercially available $N^{14}H_3$ gas at a pressure of 0.45 Torr.

DESCRIPTION OF THE PREFERRED EMBODIMENTS

Figure 1:
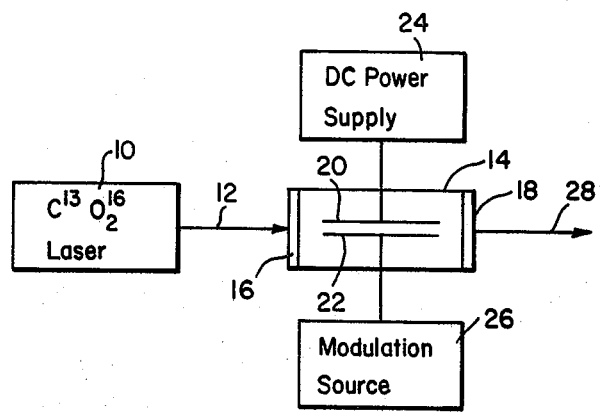
FIG. 1 is a block diagram, partially in schematic form, illustrating a Stark-tuned laser modulator in accordance with the invention.

Referring to FIG. 1 with greater particularity, a Stark-tuned laser modulator according to the invention may be seen to include a laser oscillator 10 for generating a laser beam 12. Oscillator 10 employs as the laser medium isotopic carbon dioxide $C^{13}O_2^{16}$ and is tuned to either the R(18) transition (at a wavelength of 10.784 μm) or the R(24) transition (at a wavelength of 10.738 μm) of the (00°1–10°0) vibrational band. Disposed in the path of the laser beam 12 is a Stark cell 14 containing ammonia gas ($N^{14}H_3$) at a pressure ranging from about 0.45 Torr to about 0.7 Torr, preferably being about 0.45 Torr. As a specific example for illustrative purposes, the Stark cell 14 may be a stainless steel tube of a 2 cm diameter and 10 cm length. The cell 14 is provided with a pair of end windows 16 and 18, which may be of ZnSe, and a pair of parallel electrode plates 20 and 22 disposed on opposite sides of the laser beam 12. The plates 20 and 22 may be of alumina provided with an evaporated gold coating and may be 10 cm long and 1 cm wide with a plate separation of 1.27 mm.

The $N^{14}H_3$ gas within the Stark cell 14 has an absorption resonance which may be tuned to overlap the frequency of the laser beam 12 by the generation of a suitable electric field within the cell 14. This may be achieved by applying a dc voltage from a variable dc power supply 24 across electrode plates 20 and 22 of the cell 14. When the incoming laser beam 12 is at a wavelength of 10.784 μm, corresponding to the R(18) transition, the asQ(6,6) absorbing transition in $N^{14}H_3$ is utilized. Also, it is preferable that the incoming laser beam 12 be polarized so that its electric field vector is parallel to the direction of the electric field between the plates 20 and 22.

Figure 2:
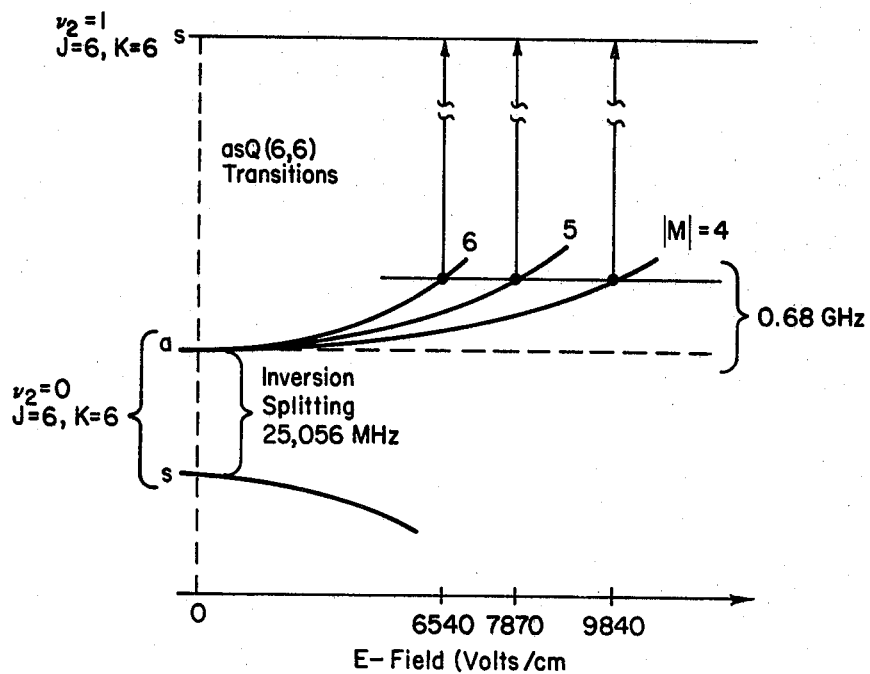
FIG. 2 is an energy level diagram for molecules of the Stark-tunable gas employed in the modulator of FIG. 1.

In the absence of an applied electric field the frequency of the as Q (6,6) transition of $N^{14}H_3$ is approximately 0.68 GHz above the line center frequency (corresponding to 10.784 μm) of the incoming laser beam 12. As shown in FIG. 2, when an electric field is applied to the $N^{14}H_3$ gas within the cell 12, the gas molecule energy levels become split into a number of Stark levels designated by various values of the quantum number M which represents the molecular angular momentum component along the electric field direction. For particular values of the applied electric field, the respective Stark levels $|M|$ = 6,5,4,3,2,1 for the $v_2 = 0^a$, $J = 6$, $K$ = 6 state can be shifted in energy to a level such that the frequency of the asQ(6,6) transition from the Stark level in question coincides with the frequency of the incoming laser beam 12. The appropriate electric field values for shifting the aforementioned $|M|$ = 6, 5 and 4 levels by an amount necessary to achieve the desired coincident frequency condition are about 6540, about 7870 and about 9840 volts per cm, respectively. The Stark levels designated by $|M|$ = 3, 2 1 may also be shifted to produce the desired coincident frequency condition, although higher electric field values are required which migh possibly give rise to gas breakdown.

Figure 3:
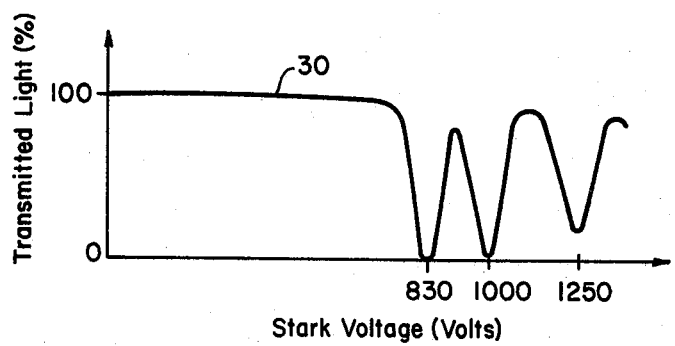
FIG. 3 is a graph illustrating the percentage of laser light transmitted through the Stark cell of the modulator of FIG. 1 as function of the voltage applied to the cell for the R(18) $C^{13}O_2^{16}$ laser line.

When the absorption resonance of the $N^{14}H_3$ gas within the cell 14 has been tuned to coincide with the frequency of the incoming laser beam 12, very high absorption of the beam 12 occurs within the cell 14. Curve 30 of FIG. 3 illustrates the percentage of laser light transmitted through a cell 14 constructed with the aforementioned specific exemplary plate dimensions and separation and containing $N^{14}H_3$ gas at a pressure of 0.45 Torr as a function of the voltage applied to the cell 14 for the 10.784 μm R(18) $C^{13}O_2^{16}$ laser line. Absorption resonance occur at voltage values of about 830 volts, about 1000 volts and about 1250 volts corresponding to transitions starting from the aforementioned Stark levels $|M|$ 6, 5 and 4, respectively. It may be seen that complete absorption is obtained for the $|M|$ = 6 transition, and nearly complete absorption occurs for the $|M|$ = 5 transition. An absorption coefficient of 0.40 cm$^{-1}$ Torr was measured for the $|M|$ = 6 transition.

In a laser modulator according to the invention a modulating voltage for a modulation source 26 is applied across electrode plates 20 and 22 of the Stark cell 14. For optimum modulation, the absorption resonance of the $N^{14}H_3$ gas within the cell 14 should be tuned so that a substantially linear portion of the absorption versus frequency characteristic along either the upper or lower edge of the absorption resonance (and not the absorption peak) coincides with the frequency of the laser beam 12. As a specific illustrative example, when modulating the 10.784 μm R(18) $C^{13}O_2^{16}$ laser line using a Stark cell 14 constructed with the aforementioned specific exemplary parameter values [and utilizing the $|M|$ = 6 Stark level in the asQ(6,6) transition in $N^{14}H_3$], an appropriate voltage from dc power supply 24 may be 780 volts. A suitable modulating voltage from modulation source 26 to be used in conjunction with such a bias voltage may have an amplitude of 40 volts peak-to-peak. By varying the frequency of the absorption resonance of the $N^{14}H_3$ gas within the cell 14 by means of the modulating voltage from the source 26, the absorption of the laser beam in the cell 14 is varied correspondingly, producing an output laser beam 28 which is modulated in accordance with the modulating voltage.

As was mentioned above, the laser oscillator 10 alternatively may be tuned to the R(24) transition of the (00°1–10°0) vibrational band of $C^{13}O_2^{16}$ to provide a laser beam 12 at a wavelength of 10.738 μm. When the laser beam 12 is at 10.738 μm, the asQ(2,2) absorbing transition in $N^{14}H_3$ is utilized, preferably from the Stark level designated by the angular momentum quantum number $|M|$ = 2. This may be achieved by providing an electric field of about 14,200 volts per cm within the cell 14. For a cell 14 constructed with the aforementioned exemplary electrode plate separation of 1.27 mm, this electric field value can be achieved with a voltage of about 1600 volts. When operating with voltages of this magnitude, it may be desirable to reduce the gas pressure within the cell 14 (to around 0.25 Torr, for example) in order to provide an operating condition further away from that at which gas breakdown might occur.

The present inventors have found that the use of either the R(18) line or the R(24) line of the (00°1–10°0) vibrational band of a $C^{13}O_2^{16}$ laser in conjunction with the Stark-tuned absorption resonance in $N^{14}H_3$ gas is critical to achieving the dramatically improved results provided by the present invention. The inventors investigated the absorption in $N^{14}H_3$ gas in the presence of Stark fields below those which would produce gas breakdown for 25 different $C^{13}O_2^{16}$ laser transitions of the (00°1–10°0) vibrational band [P(10) through P(32) and R(10) through R(34)], and only the R(18) and R(24) lines produced in excess of 50% absorption. Small absorption was found for the R(26) line, and no absorption was observed for any of the other $C^{13}O_2^{16}$ laser transitions.

A Stark-tuned laser modulator constructed according to the invention using the R(18) transition and the aforementioned specific exemplary parameter values has achieved a modulation depth of 37% for a 40-volt peak-to-peak sinusoidal modulating voltage at a frequency of 1 MHz, and a 3.7% modulalation depth (with almost no distortion) for a 7-volt base-to-peak random binary word modulating signal at a clock frequency of 180 MHz. Moreover, measurements with a spectrum analyzer have indicated that reliable operation with modulating frequencies approaching 300 MHz is readily achievable. In contrast, reliable operation of prior art Stark-effect laser beam modulators has been limited to around 30 MHz. In addition, the foregoing modulation with a device according to the invention was achieved with a laser beam power density of 12 watts per cm² using a Stark cell of 10 cm length and containing commercially available $N^{14}H_3$ gas at a pressure of 0.45 Torr.

Thus, a Stark-tuned laser modulator according to the invention is able to achieve increased modulation depths, increased modulating frequencies, and increased usable laser power densities in a reliable device of minimum size, weight and cost. In addition, since isotopic $C^{13}O_2^{16}$ laser lines undergo considerably less absorption in the atmosphere than ordinary $C^{13}O_2^{16}$ laser lines, a modulator according to the invention is especially suitable for use with long range laser communication systems.

It is further pointed out that although Stark cell 14 is shown disposed external to the laser 10, alternatively the Stark cell may be disposed within the optical cavity of the associated laser so as to provide Q-switching modulation of the generated laser beam, for example.

As stated more generally, although the present invention has been shown and described with reference to particular embodiments, nevertheless various changes and modifications which are obvious to a person skilled in the art to which the invention pertains are deemed to lie within the spirit, scope and contemplation of the invention.

What is claimed is:

1. A laser modulator comprising in combination:
    means including a $C^{13}O_2^{16}$ laser medium for generating a laser beam at a frequency corresponding to a transition selected from the group consisting of the R(18) transition and the R(24) transition of the (00°1–10°0) vibrational band of $C^{13}O_2^{16}$;
    a Stark cell disposed in the path of said laser beam and containing $N^{14}H_3$ gas, said gas having an absorption resonance in the vicinity of the frequency of said laser beam;
    means for generating a dc electric field within said Stark cell of a value to tune said absorption resonance so as to overlap the frequency of said laser beam; and
    means for applying a modulating voltage to said Stark cell to vary the instantaneous frequency of said absorption resonance and thereby modulate said laser beam accordingly.

2. A laser modulator according to claim 1 wherein said laser beam is at a frequency corresponding to said R(18) transition, and said dc electric field is of a value to tune the absorption resonance of said $N^{14}H_3$ gas corresponding to the asQ(6,6) transition of $N^{14}H_3$ to overlap the frequency of said laser beam.

3. A laser modulator according to claim 2 wherein said $N^{14}H_3$ gas is at a pressure ranging from about 0.45 Torr to about 0.7 Torr.

4. A laser modulator according to claim 1 wherein said laser beam is at a frequency corresponding to said R(18) transition, and said dc electric field of a value to tune the absorption resonance of said $N^{14}H_3$ gas corresponding to the asQ(6,6) transition of $N^{14}H_3$ from a Stark level given by the quantum number M, representing the molecular angular momentum component along the direction of said electric field, selected from the group consisting of $|M| = 6, 5$ and 4 to overlap the frequency of said laser beam.

5. A laser modulator according to claim 4 wherein $|M| = 6$.

6. A laser modulator according to claim 4 wherein said $N^{14}H_3$ gas is at a pressure of about 0.45 Torr.

7. A laser modulator according to claim 1 wherein said laser beam is at a frequency corresponding to said R(24) transition, and said dc electric field is of a value to tune the absorption resonance of said $N^{14}H_3$ gas corresponding to the asQ(2,2) transition of $N^{14}H_3$ to overlap the frequency of said laser beam.

8. A laser modulator according to claim 1 wherein said laser beam is at a frequency corresponding to said R(24) transition, and said dc electric field is of a value to tune the absorption resonance of said $N^{14}H_3$ gas corresponding to the asQ(2,2) transition of $N^{14}H_3$ from the Stark level given by the quantum number $|M| = 2$, representing the molecular angular momentum component along the direction of said electric field, to overlap the frequency of said laser beam.

9. A laser modulator according to claim 8 wherein said $N^{14}H_3$ gas is at a pressure of about 0.25 Torr.

* * * * *

UNITED STATES PATENT AND TRADEMARK OFFICE
CERTIFICATE OF CORRECTION

PATENT NO. : 4,085,387
DATED      : April 18, 1978
INVENTOR(S) : CHARLES K ASAWA and THOMAS K. PLANT It is certified that error appears in the above-identified patent and that said Letters Patent are hereby corrected as shown below:

Column 1, line 15, "turn" should read --tune--.

Col. 2, line 8, before "laser", --and $N_2^{14}O^{16}$-- should be inserted.

Column 2, line 39, "comrises" should read --comprises--.

Column 3, line 68 "migh" should read --might--.

Signed and Sealed this

Twenty-seventh Day of March 1979

[SEAL]

Attest:

RUTH C. MASON
Attesting Officer

DONALD W. BANNER
Commissioner of Patents and Trademarks